Feb. 14, 1956  A. G. BADE  2,734,397
MECHANICAL TYPE INFINITELY VARIABLE SPEED-CHANGING TRANSMISSION
Filed May 14, 1951  3 Sheets-Sheet 1

Inventor
ALFRED G. BADE
By
Miles Kenninger
Attorney

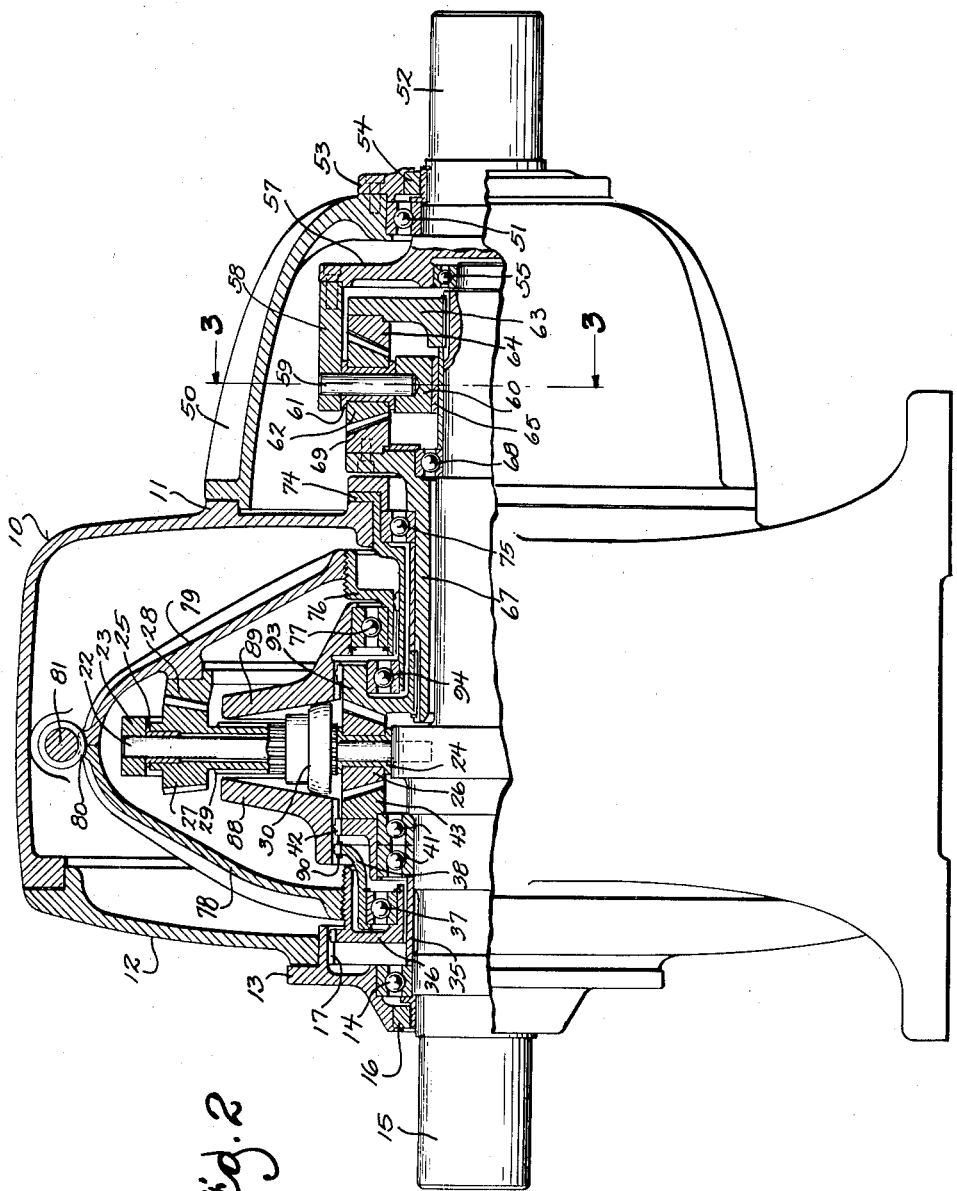

Feb. 14, 1956 A. G. BADE 2,734,397
MECHANICAL TYPE INFINITELY VARIABLE SPEED-CHANGING TRANSMISSION
Filed May 14, 1951 3 Sheets-Sheet 3
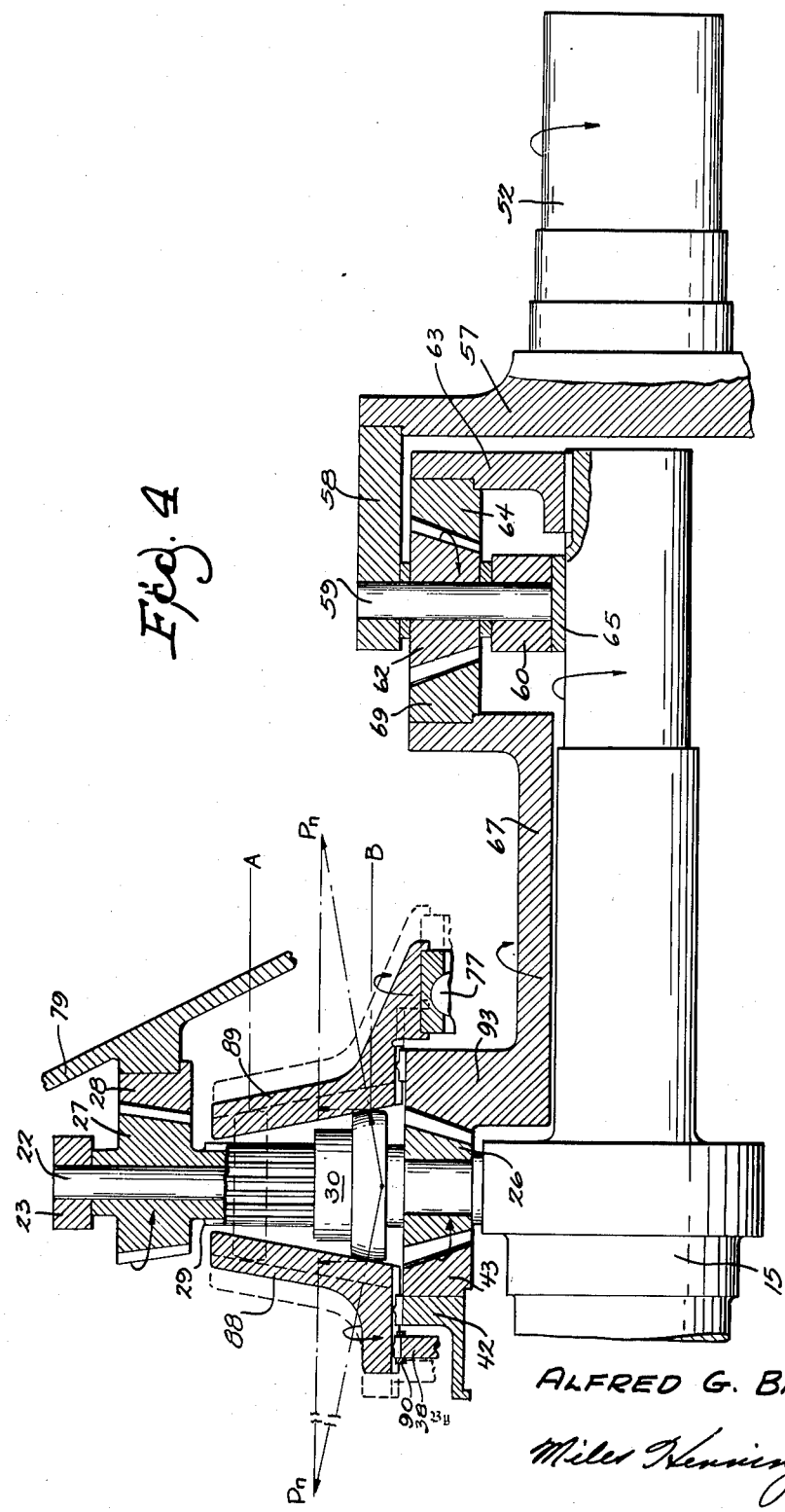
Inventor
ALFRED G. BADE
Miles Kenninger
Attorney

United States Patent Office 2,734,397
Patented Feb. 14, 1956

2,734,397

MECHANICAL TYPE INFINITELY VARIABLE SPEED-CHANGING TRANSMISSION

Alfred G. Bade, Milwaukee, Wis., assignor to The Falk Corporation, Milwaukee, Wis., a corporation of Wisconsin Application May 14, 1951, Serial No. 226,162

15 Claims. (Cl. 74—691)

This invention relates to a mechanical type of infinitely variable speed-changing transmission in which the speed change is obtained by varying the relative positions of adhesion or friction elements and of which some of such elements have planetary movement.

In the known constructions of infinitely variable speed-changing transmissions of the planetary adhesion element type, the planetary elements must be of considerable mass for a number of reasons especially when the axes of such elements are inclined to the axis of the driving shaft. Some of the adhesion elements are subjected to gyrostatic forces which vary dependent on the speed, and produce local reactions disturbing the operation of the device. Reltaively high pressures per unit area of the adhesion contact surfaces, are required for transmitting given amounts of power and such pressures are usually applied to the planetary elements in an unbalanced manner. The planetary adhesion elements are usually relatively closely associated by way of the non-planetary adhesion elements and are therefore considerably affected as a whole by abnormal operation of any one of the planetary elements.

Further, when all of the power flow is taken through the adhesion elements, the quantity of power transmitted is limited to a large degree by the pressures obtainable and sustainable in a practical transmission of the adhesion element type. There is no division and equalization of pressures between a number of adhesion elements in the known constructions and there is no practical manner for transmitting reaction torque to relatively stationary portions of the structure. In the known adhesion type drives, the adhesion members have not been mounted to "float" or adjust themselves as required by the forces involved.

It is therefore an object of the present invention to provide an infinitely variable speed-changing transmission of the planetary adhesion element type in which the planetary elements are of relatively small mass and are subjected substantially to only centrifugal force of which the moment arm is readily varied to obtain varying pressures between the adhesion elements and thus provides a means for changing speed between the input and output shafts.

Another object of the present invention is to provide an infinitely variable speed-changing transmission of the planetary adhesion element type in which the planetary elements provide a large number of surfaces in contact with their mating elements and in such manner that the pressure per unit area of contact is minimized and that the pressures on the planetary elements are balanced and equalized.

Another object of the present invention is to provide an infinitely variable speed-changing transmission of the planetary adhesion element type in which the planetary elements are relatively independent and unaffected by abnormal actions or reactions of other planetary elements.

Another object of the present invention is to provide an infinitely variable speed-changing transmission of the planetary adhesion element type in which only a portion of the power to be transmitted, must flow through the adhesion elements so that a larger quantity of power may be transmitted than would otherwise be possible at a given pressure between the adhesion elements.

Another object of the present invention is to provide an infinitely variable speed-changing transmission of the planetary adhesion element type in which all the adhesion elements are symmetrical and are symmetrically arranged about the longitudinal axis of the device and about an axis at right angles thereto, to minimize vibrations in the device.

Another object of the present invention is to provide an infinitely variable speed-changing transmission of the planetary adhesion element type in which the reaction forces are so transmitted to a stationary portion of the structure as to avoid difficulties in adjusting the transmission to any desired speed ratio and at any point in the speed range.

Another object of the invention is to provide an infinitely variable speed transmission in which adhesion elements are utilized for varying the speed of one shaft and are mounted for self-adjustment and so interconnected as to equalize the pressures between a large number of pairs of contact points.

A further object of the invention is to provide a variable speed transmission in which all adhesion elements are rotatable and the reaction pressures are transmitted to a fixed portion of the structure otherwise than by way of the adhesion elements.

A further object of the invention is to provide a variable speed transmission in which speed variation is obtained by varying the relationship in space of the adhesion elements, and in which the input and output shafts rotate in the same directions and the adhesion elements are therefore subjected only to the difference between the input and output torques.

Another object of the invention is to provide a variable speed transmission in which torque is transmitted through both sides of adhesion rollers by means of rotating adhesion disks.

And a further object of the invention is to provide an infinitely variable transmission employing adhesion elements for variation of speed and in which the adhesion elements are so related that the relationship in space between one set of elements and another set of elements are variable by the application of a force which is only a small fraction of the power transmitted by way of such elements.

Objects and advantages other than those above set forth will be apparent from the following description when read in connection with the accompanying drawing in which:

Fig. 2 is a view partially in elevation and partially in section along the axis of the input and output shafts of the transmission.

Figure 1:
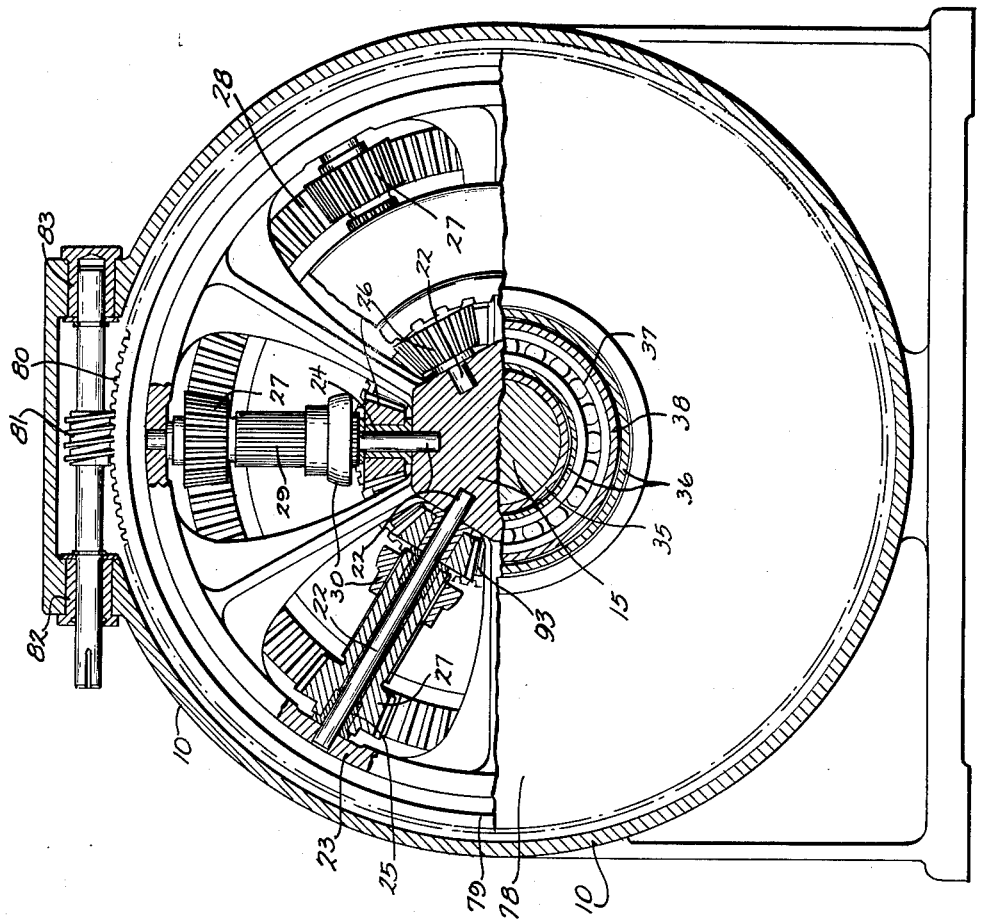
Fig. 1 is a view partially in elevation and partially in section on a plane transverse to the axis of the input and output shafts of a transmission embodying the present invention.
Figure 3:
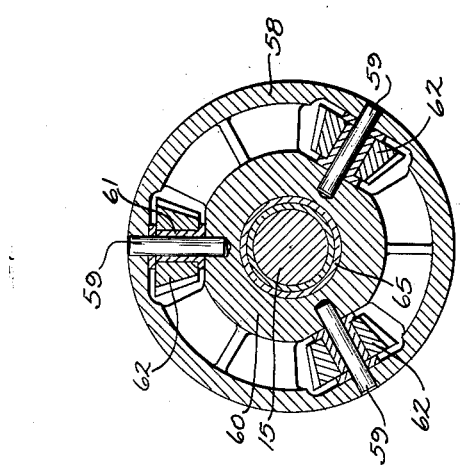
Fig. 3 is a cross-sectional view on the plane 3—3 of Fig. 2.

Fig. 4 diagrammatically illustrates the path of power flow through a portion of the transmission and the directions of movement or tendency to movement of some of the parts in such transmission and further illustrates the structure of portions of such transmission.

Generally stated, the present structure includes constant and variable speed shafts and in which power is transmitted from the constant speed shaft to the variable speed shaft in an infinitely variable manner within a given range. The constant speed shaft subjects adhesion rollers to substantially only centrifugal force which is variable as the distance of the rollers from the shaft axis is varied. The rollers severally act at diametrically opposite points on adhesion disks which are adjustable to control the position of the rollers radially of the constant speed shaft and by which the rollers are caused to rotate about their axis as planets. Rotation of the rollers is transmitted to gears receiving the reaction forces and transmitting such forces through a reaction gear to a portion of the structure having only limited movement relative to the housing. The disks are floatingly (self-adjusting) mounted on gearing which equalizes the pressures between the disks and the rollers, and the disks may position themselves relative to the rollers axes as required to maintain equalized pressures between the adhesion elements.

Planetary gearing connects the two shafts and the orbit gear of such gearing is rotatably driven by power received from the adhesion pressure equalizing gearing. Some of the power is thus transmitted by way of the adhesion pressure equalizing gearing but far larger amounts of power are transmitted by way of the planetary gearing and do not pass through the adhesion pressure equalizing gearing. The torque reactions of the transmission are transmitted to bevel gearing and thence to a yoke and from the yoke to the housing. However, because one of the adhesion driving disks rotates, the tangential forces transmitted are small and, since the normal (perpendicular) forces are balanced, the device is easily adjusted. Because both of the disks float or adjust themselves relative to the rollers and hence to each other, the entire reaction portion of the adhesion assembly may be said to be self-adjusting.

Referring to the drawings in which like numerals designate like parts, a housing element 10 provides a side wall, an end wall and a base portion of the housing. The housing end wall portion is formed with a flange 11 of which the purpose appears hereinafter. An open end of the housing element 10 is substantially closed by an end wall 12, both the end walls of the housing having aligned apertures therethrough. The aperture in end wall 12 receives a plate 13 in which is mounted a bearing 14 for partially supporting a first shaft 15. The plate 13 also receives a seal 16 for preventing escape of lubrication from the bearing and about the shaft. A cylindrical surface of the plate 13 is splined internally as indicated at 17.

Shaft 15 has an enlarged portion within the housing and such portion is provided with a plurality of sockets spaced equally about and extending radially of the shaft. The sockets (six being used in the present construction) receive a plurality of stems 22 to extend from the shaft in the manner of the spokes of a wheel. The ends of the stems are joined by a ring 23 thus completing the wheel-like appearance of the structure. Bearings 24 and 25 are mounted on each of the stem-spokes 22 adjacent the shaft 15 and the rings 23, respectively. The bearings 24 support bevel gears 26 and receive the end thrust of bevel gears 27 which are mounted on the bearings 25. Both gears 26 and 27 rotate about the axis of shaft 15 and about their respective axles 22, the axes of such axles being radially of the shaft and in the same plane at right angles to the shaft axis. The gears 27 mesh with a ring gear 28 which is mounted on a comparatively immovable part, and such ring gear causes rotation of gears 27 about their axles 22.

Gears 27 each have a hub-like extension 29 which encloses portions of the axles 22 and such extensions are externally splined. Rollers 30 are mounted on each of the gear extensions 29 and have internal splines engaging the gear hub external splines so that the rollers may move axially of such extensions and are connected for rotation with gears 27. The rollers have peripheral surfaces at an angle to the axes thereof and such surfaces are preferably somewhat crowned for frictionally engaging surfaces of other elements of the structure by substantially a line contact and for positioning the rollers dependent upon the positioning of such other elements.

The splined surface 17 of housing plate 13 coacts with a sleeve 35 on the shaft 15 to define a substantially annular space in which a flanged ring 3 is movable axially of the shaft. A peripheral edge of ring 36 is formed with teeth to engage in the splines of plate flange 17 so that the ring 36 is substantially held against rotational movement. The flanges of ring 36 also define an annular space in which is mounted a bearing 37 for rotatably supporting an angle ring 38 having a toothed peripheral edge. A plurality of bearings 41 are mounted on the shaft 15 adjacent the ring 36 to support another flanged ring 42 with a toothed peripheral edge and a bevel gear ring 43 which is preferably fixed to the ring 42. The ring gear 43 meshes with the bevel pinions 26 on the axles 22 so that the latter pinions have a planetary action.

Referring now to the right hand end of Fig. 2, a bell-like housing member 50 is positioned on the end wall portion of the housing element 10 by means of the housing flange 11 and is fixed on such flange. The housing bell 50 has an aperture aligned with the apertures in the end walls of the housing 10 and receives a bearing 51 partially supporting a shaft 52, a plate 53 with a seal 54 closing the space about the shaft 52. The end of shaft 52 within the housing has a socket in which is mounted a bearing 55 receiving the end of shaft 15 within the housing, so that shaft 15 is supported by a plurality of bearings.

Shaft 52 has arms 57 extending at a right angle to the axis of the shaft and such arms support a cylinder 58 from which pins 59 extend radially inwardly, the inward ends of the pins being joined by a ring 60, the ring being supported by a bearing 65. Such pins support bearings 61 on which are severally mounted bevel pinions 62. A flange 63 is keyed to the shaft 15 and has fixed thereon a bevel ring gear 64 meshing with the pinions 62. A sleeve 67 extends in a spaced relation over a portion of shaft 15 and is supported by bearings 68 and 75 mounted respectively on the shaft 45 and in the end wall portion of housing element 10. Such sleeve is flanged at one end to support a bevel ring gear 69 also meshing with the pinions 62. The gears 62, 64 and 69 form a planetary gear train in which gears 64 and 69 rotate in opposite directions on coincident axes about central gear 62 offset from said axes.

A sleeve 74 is fixed in the aperture of the end wall of housing element 10 and extends about the sleeve 67 and is formed with external splines for engaging the internal splines of an angle ring 76. The angle ring 76 is externally threaded and supports a bearing 77. A yoke is formed as a hollow ellipsoid to provide two leg portions 78 and 79 with a peripheral portion at least partially threaded as indicated at 80. The yoke legs are apertured and flanged and internally threaded to engage with threads on the angle rings 36 and 76, such threads being right and left-hand threads. The peripheral yoke thread 80 forms at least a portion of a worm wheel engageable with a worm 81 mounted in bearings 82 and 83 in the housing element 10.

A pair of generally conical disks 88, 89 is provided with central apertures severally defined by flange-like extensions and the disks are mounted to define a space within which the set of rollers 30 operates. The adjacent surfaces of the disks are at the same angle to the plane through the axes of the rollers as the peripheral friction surfaces of the rollers. The disks are of such diameter that the roller friction surfaces are always in contact with the adjacent disk surfaces, even though the rollers move outwardly from the position designated B (see Fig. 4) to the position A. The internal surfaces of the disk apertures are splined, the splines of disk 88 engaging the splines on the angle rings 38 and 42, the splines of the ring 38 being restricted in their movement relative to the disk splines by snap rings 90 inserted in grooves in the disk at both sides of the ring 38. Hence, as angle ring 38 is moved axially of the shaft 15, the disk 88 moves with the ring and the disk slides on the splines of gear ring 42.

A bevel gear ring 93 is keyed to the sleeve 67 and is supported on bearing 94 seated on sleeve 74, for rotation of the gear ring 93 relative to the fixed sleeve 74. The gear ring 93 is externally splined for slidably engaging with the splines of disk 89 as such disk moves axially of shaft 15. Disk 89 is also supported on the bearing 77 for rotation relative to the shaft and such bearing is held on the angle ring 76 so that the disk 89 moves axially of the shaft as the angle ring 76 is rotated.

In operation, it is assumed that the shaft 15 is operating at a constant speed of 1800 R. P. M. and that the speed of shaft 52 is to be varied continuously from zero speed to a maximum, the maximum speed of the shaft 52 being dependent on the ratio of the gearing employed and being 630 R. P. M. in the present instance. For standstill or zero speed of the shaft 52, worm 81 is rotated to move yoke 78, 79, 80 in a direction to thread rings 36, 76 toward each other. Such rings act respectively through bearing 37 on angle ring 38 and through bearing 77 on the disks 88 and 89 to force the disks toward each other. The adjacent surfaces of the disks press on the friction surfaces of rollers 30 and exert a wedging action on the rollers to retain the rollers in the position shown, namely, position B. Such wedging action is the result of the additive effect of movement of pairs of screw threads so that little force is required to secure the necessary roller-disk pressures.

The rollers 30 move around the axis of the shaft 15 as the shaft rotates and are therefore under the action of centrifugal force of a value depending on the length of the moment arm from the axis of the shaft to the line of contact of the roller crowned surfaces 30 with the surfaces of disks 88, 89. Rotation of shaft 15 turns spokes 22 relative to ring gear 28 thereby rotating gears 27 and rollers 30 splined thereto.

The total pressure between the set of rollers 30 and the set of disks 88, 89 is divided into twelve parts but may be further divided if desired, by increasing the number of rollers. Such pressure provides the necessary traction effort to transmit the torque on the disks 88, 89 which is equalized by connection of the disks by way of the equalizing gearing 42, 43, 26 and 93. Torque is transmitted from the disks by way of the equalizing gearing to the sleeve 67 which drives the gear 69. Hence, the speed at which the shaft 52 is driven depends only on the ratio of the planetary gearing 62, 64, 69 and the speed at which gear 69 is driven by sleeve 67.

The driving forces react from the adhesion elements 30, 88 and 89 to the planet bevel pinion 27 to the bevel gear 28 and thence through the yoke 78, 79, 80 to the worm 81 and the housing. Hence, the adhesion disks are not subjected to high reaction forces.

In position B rollers 30 act on a relatively small circumference of disk 89 to counterrotate sleeve 67 at high speed substantially equal to the speed of shaft 15. Thus gears 63 and 69 are counterrotated at the same speed and pins 59 and shaft 52 are stationary.

To achieve maximum speed of shaft 52, the rollers 30 must be allowed to move from position B to position A where the circumference of the disk 89 is greatest, it being understood that speeds between zero and maximum of the output shaft are obtained in the positions of the rollers between B and A in proportion to the circumference of disk 89 where it is contacted by rollers 30. The yoke 78, 79, 80 is now moved to allow the disks 88, 89 to separate so that the centrifugal force on the rollers will move the rollers to position A. At position A, the rollers act on the greatest circumference of disk 89. Thus sleeve 67 is driven at relatively slow speed counter to shaft 15. Thus pins 59 and shaft 52 are driven in the same direction as shaft 15 but at lower speed, dependent on the ratio of the gearing connecting the shafts. Thus, for the proportions indicated in the drawings, for the output shaft to rotate at 630 R. P. M. or more, bevel gear 69 and sleeve 67 must counterrotate at a speed of 540 R. P. M. and when the output shaft is to be at standstill, bevel gear 69 and sleeve 67 must counterrotate at the maximum speed of 1800 R. P. M. (full input speed).

It will be seen that the present construction provides a housing 10 with a side and end wall element from which may be overhung a housing bell 50, and on which is fixed a removable end wall 53. A first shaft 15 extends into the housing 10 and has a plurality of spoke-like or radially arranged members 22 with their axes in the same plane. Means formed as externally splined gears 27 are severally mounted on the radial members 22 for rotation therewith about the axis of the first shaft and for rotation relative to the members. Rollers 30 with adhesion or friction surfaces are splined on the gears 27 for movement axially thereof and hence radially of the first shaft to vary the points of contact of rollers 30 with the disk 89. A pair of disks 88, 89 alongside the rollers coacts with the rollers 30 to provide a plurality of pairs of contact surfaces and such disks 88, 89 may be adjusted as to axial spacing to allow centrifugal force movement of the rollers away from the axis of the first shaft or to force such rollers toward such axis.

The disks are movable axially of the first shaft by angle rings 38, 76. The rings 38, 76 are movable axially relative to the housing 10 and are rotatably mounted. A yoke 78, 79 threadedly engages the angle rings 36, 76 and the housing 10 for adjustment of the rings and the disks and to transmit the reaction forces to the housing. Such torque reaction forces are transmitted from the splined gears to a bevel gear ring 28 on the yoke.

Even though the yoke 78, 79 and the angle rings 36, 76 are threadedly engaged, at least one of the rings has a dental coupling connection 17 which permits it to "float" or adjust itself as required by the normal and tangential forces acting on the disks to the end that such forces are equalized. The disks are further severally supported by way of dental couplings 42 with two gear rings 43 and 93 rotatable relative to the shaft and such gear rings 43, 93 are joined by idler pinions 26 severally mounted on the axles 22 extending radially from the first shaft. The gear rings and idler pinions 26 equalize the tangential forces acting between the rollers 30 and the disks 88, 89 and the torque exerted on said disks is transmitted by said disk 89 to sleeve 67 concentric with shaft 15. The normal (perpendicular) pressures acting on the rollers 30 and disks 88, 89 are balanced by "floating" or self-adjustment of the disks axially of the device as aforesaid. The sleeve 67 is rotatably supported in the housing and aids in rotatably supporting the first shaft 15 relative to the housing and the sleeve.

A second shaft 52 is rotatably supported in the housing bell 50 and at the end of the first shaft 15. The two shafts are joined by planetary gearing comprising a ring gear 64 fixed to shaft 15, a ring gear 69 fixed to sleeve 67 and orbit gears 62 mounted between the ring gears on pins 59 journaled in cylinder 58. The preponderance of the power flows through the planetary gearing 64, 62, 69 and only a minor portion of the power flows through the pressure equalizing gearing and the adhesion elements in housing 10. The planetary gearing has the effect of extending both the quantity of power transmissible and the range of speed ratios obtained when the one shaft is driven at constant speed and the other shaft is driven at variable speed, as compared to other mechanical type variable speed devices now known.

The present construction utilizes planetary adhesion rollers 30 which are of relatively small mass and have axes at right angles to the shaft driving the rollers. A considerable number of rollers are clustered uniformly and relatively closely around the drive shaft and the rollers are subjected both to centrifugal force and to rotative thrust. The spacing of disks 88, 89 and centrifugal force acting on the rollers 30 dictate the circumference of the disks on which the rollers ride and thus determine speed of the sleeve 67 and thereby the speed of shaft 52. The disks 88, 89 contact the rollers 30 at diametrically opposite points so that the pressures on each of the rollers 30 are balanced. The disks 88, 89 are interconnected and are mounted for self-adjustment to equalize pressures of the rollers on the disks. The reaction torques are transmitted from disks 88, 89 directly to the housing. Both the first and the final second shaft rotate in the same direction, counter to the direction of rotation of sleeve 67, so that the reaction torque of the drive as a whole is the difference between the input torque and the output torque.

Only a fraction of the power transmitted need pass through the speed-changing adhesion elements in housing 10, the major portion of the transmitted power flowing through the first shaft 15 and the gearing 64, 62, 69 to the second shaft 52. Therefore, in addition to infinite variation of the speed within the range for which the parts are proportioned, the present device has the advantages of long life with minimum maintenance, and a largely increased power transmission capacity as compared with the prior planetary adhesion type speed-change devices.

Although but one embodiment of the present invention has been illustrated and described, it will be apparent that various changes and modifications may be made therein without departing from the invention as defined in the appended claims.

I claim:

1. In a device for transmitting power at an infinitely variable speed ratio between input and output shafts, a first shaft, a plurality of adhesion elements in mutual contact and rotatably driven by the first shaft, means for varying the point of contact of one element against another, means for sustaining the reaction torque between the elements, means for reacting on the adhesion elements and providing a path for a portion of the power transmitted, a second shaft, and planetary gearing for joining the first and second shafts for transmitting a portion of the power therebetween and for receiving the portion of the power transmitted by the reacting means, the speed ratio of the shafts varying as the point of contact of the adhesion elements is varied.

2. In a device for transmitting power at an infinitely variable speed ratio between input and output shafts, a first shaft, a plurality of spoke-like members extending radially from the first shaft, a plurality of rollers severally mounted on the spoke members and movable radially of the first shaft under the action of the centrifugal force exerted thereon by shaft rotation, a pair of disks supported on for rotation about the first shaft at opposite sides of said spoke-like members and frictionally engaged with said rollers, means for adjusting the radial position of the rollers to vary the circumferential point of engagement of the rollers with the disks, means for sustaining the reaction torque between the disks, means for reacting on the rollers and disks and providing a path for a portion of the power transmitted, a second shaft, and planetary gearing for joining the first and second shafts for transmitting a portion of the power therebetween and for receiving the portion of the power transmitted by the reacting means, the speed ratio of the shafts varying as the radial position of the rollers respecting the disks is varied.

3. In a device for transmitting power at an infinitely variable speed ratio between input and output shafts, a housing, a first shaft, a plurality of spoke-like members extending radially from the first shaft, rollers severally mounted on the members and movable radially of the shaft axis, a pair of disks supported for axial movement thereon and rotatable relative to the shaft members for engaging the rollers at opposite sides of the spoke-like members, a yoke rotatably adjustable relative to the shaft and engaged with the housing, the yoke controlling the axial position of the disks and the radial position of the rollers, said yoke comprising means for sustaining the reaction torque between the rollers and disks, means for reacting on the rollers and disks and providing a path for a portion of the power transmitted, a second shaft, and planetary gearing for joining the first and second shafts for transmitting a portion of the power therebetween and for receiving the portion of the power transmitted by the reacting means, the speed ratio of the shafts varying as the radial and axial positions of the rollers and disks is varied.

4. In a device for transmitting power at an infinitely variable speed ratio between input and output shafts, a housing, a first shaft, a plurality of spoke-like members extending radially from the shaft and with their axes in the same plane, fixed gear means concentric with said first shaft, gear means on said members meshing with said fixed gear means to be rotated as said first shaft is turned, rollers severally rotatable on the members and splined to the gear means mounted on the members for radial movement on said members, a pair of disks supported for axial movement and rotatable relative to the shaft and frictionally engaged with the rollers, said disks being inclined with respect to the axis of roller rotation, a yoke rotatably adjustable relative to the shaft and engaged with the housing, the yoke controlling the axial position of the disks and radial position of the rollers and sustaining the reaction torque between the disks and the rollers, means for reacting on the rollers and disks and providing a path for a portion of the power transmitted, a second shaft, and planetary gearing for joining the first and second shafts for transmitting a portion of the power therebetween and for receiving the portion of the power transmitted by the reacting means, the speed ratio of the shafts varying as the axial position of the disks and radial position of the rollers is varied.

5. In a device for transmitting power at an infinitely variable speed ratio between input and output shafts, a housing, a constant speed shaft, spoke-like members extending radially from the shaft, gears mounted on the spoke-like members for rotation thereabout, the gears having hub extensions externally splined, rollers severally mounted on the splined extensions of the gears, a pair of disks supported for rotation relative to the shaft for engaging the several rollers on a given circumference of the disks, a yoke rotatably adjustable relative to the shaft and engaged with the housing, a circular rack mounted on the yoke for meshing with the said gears whereby to turn said rollers when the constant speed shaft is turned, means for reacting on the rollers and disks and providing a path for a portion of the power transmitted, a second shaft, and planetary gearing for joining the first and second shafts for transmitting a portion of the power therebetween and for receiving the portion of the power transmitted by the reacting means, said rollers being mounted for radial movement on said members whereby to vary the point of circumferential engagement of said rollers with said disks, the speed ratio of the shafts varying as the point of circumferential engagement of the rollers and disks is varied.

6. In a device for transmitting power at an infinitely variable speed ratio between input and output shafts, a first speed shaft, a plurality of first adhesion elements mounted for radial movement and subject to centrifugal force of shaft rotation, means for rotating said elements, a plurality of second adhesion elements rotatably supported relative to the shaft and frictionally engaged with the first adhesion elements, said second elements being inclined to the radial path of said first elements whereby axial movement thereof is necessary to permit radial movement of the first elements, means for adjusting the axial positions of the second adhesion elements and thereby controlling the centrifugal position of the first adhesion elements on said radial path, means for reacting on the adhesion elements and providing a path for a portion of the power transmitted, a second shaft, and planetary gearing joining the first and second shafts, one portion of the gearing being driven by the reacting means and another portion of the gearing being driven by the constant speed shaft, the speed of the second shaft varying as the radial position of the first adhesion elements varies relative to the first shaft.

7. In a device for transmitting power at an infinitely variable speed ratio between the input and output shafts, a constant speed shaft, a first set of adhesion elements rotated by the shaft and subjected to centrifugal force thereby, the first adhesion elements being movable radially of the shaft, a second set of adhesion elements rotatably supported relative to the shaft and frictionally engaged with the first adhesion elements, the second adhesion elements being movable axially of the shaft, means for adjusting the positions of the second adhesion elements and for controlling the position of the first adhesion elements relative to the axis of the shaft, means for reacting on the sets of adhesion elements and for forming a path for transmission of a portion of the power through the device, a variable speed shaft, a gear connected with the reacting means and rotated thereby, a gear connected with the constant speed shaft, and a plurality of planet gears mounted on the variable speed shaft, the planet gears meshing with the gears aforesaid and transmitting power between the shafts.

8. In a device for transmitting power at an infinitely variable speed ratio between the input and output shafts, a housing, a constant speed input shaft, a plurality of members extending radially from the shaft with their axes in the same plane, gears severally mounted on the shaft members, the gears having hub extensions externally splined, a plurality of rollers severally mounted on the splined gear extensions for movement radially of the shaft, a pair of disks adjustably supported alongside the rollers and severally engaging with each of the rollers, means for reacting on the disks, a yoke rotatably adjustable relative to the input shaft and engaged with the housing for moving the disks toward and away from each other and thereby varying positions of the rollers relative to the shaft axis and circumference of the discs contacted by the rollers, a rack or bevel gear fixed on the yoke and meshing with the shaft-member-mounted gears for rotating said gear and for transmitting reaction forces to the housing, a variable speed output shaft, the distance of the rollers from the input shaft axis varying the speed of the output shaft, and planetary gearing joining the input and output shafts for transmitting power therebetween, the planetary gearing comprising a gear driven by the means for reacting on the disks, a gear driven by the input shaft, and planet gears mounted on the output shaft for meshing with the gears aforesaid.

9. In a device for mechanically transmitting power at an infinitely variable speed ratio, the combination of an input shaft, an output shaft, a friction drive means comprising a pair of coaxial rotary disks in opposed and spaced relation, a set of rollers driven by the input shaft and arranged between the disks and in frictional engagement therewith for rotation about the disk axis, and means reacting on the rollers to impart planetary motion thereto for effecting rotation of the disks in opposite directions, the rollers being adjustable radially of the disks for varying the speed ratio between the input and output shafts, and planetary gearing driven by the input shaft and the friction drive means for driving the output shaft at speeds dependent on coaction of the disks and rollers.

10. In an infinitely variable speed transmission of the mechanical type, the combination of a first shaft and a second shaft, a speed changer including a non-rotary gear and a pair of opposed disks rotatable about the first and second shafts in opposite directions and adjustable axially thereof and a set of planetary rollers in rolling engagement with and between the disks, adjustment of the disks controlling positioning of the rollers radially of the disks, the rollers reacting on the non-rotary gear, means for moving the disks together and apart for controlling radial positioning of the rollers, and planetary gearing driven by the speed changer and connecting the first and second shafts for transmitting power therebetween.

11. In a variable speed transmission, the combination of coaxial driving and driven shafts, a friction drive means comprising a pair of opposed and oppositely rotating disks coaxial with the shafts, a set of planet rollers in pressure engagement with and between the disks, and a rotary carrier for the rollers and driven by one of the shafts, means including a non-rotary ring gear reacting on the rollers to control the planetary action thereof, the rollers being movable radially of the disks to vary the rate of rotation of the disks, and planetary gearing connecting the driving and driven shafts and responsive to variations in the rate of rotation of the disks to vary the speed ratio between the two shafts.

12. In a device for mechanically transmitting power at an infinitely variable speed ratio, a first shaft, a second shaft, a speed changer including coaxial opposed disks rotatable in opposite directions, and planet rollers rotating about the first shaft and coacting with the disks as an adhesion drive, rotation of the rollers about their own axes being in fixed relation with rotation of the rollers about the first shaft axis, and planetary gearing connecting the rollers with the first shaft through said speed changer and connecting the first and second shafts whereby only a portion of the transmitted power flows through the speed changer.

13. In a device for mechanically transmitting power at an infinitely variable speed ratio, a first shaft, a second shaft, first planetary gearing connecting the first and second shafts for transmission of a portion of the power flow therebetween, a speed changer including rotatable disks and planet rollers coacting therewith and connected with said first planetary gearing, and second planetary gearing connecting the first shaft with the first planetary gearing and with the speed changer whereby another portion of power flows through the speed changer and through the first planetary gearing to the second shaft.

14. In a device for transmitting power at an infinitely variable speed ratio, a first shaft, a second shaft, a friction means drive comprising a plurality of first adhesion elements mounted on the first shaft for rotating the first adhesion elements upon rotation of the first shaft, the first adhesion elements being subjected to centrifugal force for movement thereof radially of the first shaft, a plurality of second adhesion elements extending radially of and rotatably supported relative to the first and second shafts and frictionally engaged with the first adhesion elements, and means for adjusting the positions of the second adhesion elements axially of the first shaft and for controlling the position of the first adhesion element radially of the first shaft, means for reacting on the adhesion elements and providing a portion of a path for a portion of the power transmitted, and planetary gearing connecting the first and second shafts for transmitting the said portion of the power, the speed ratio of the first and second shafts varying as the radial position of the first adhesion elements is varied.

15. In a device for transmitting power at an infinitely variable speed ratio, a housing, a first shaft, a second shaft, a friction drive means comprising a plurality of adhesion elements rotatably driven by the first shaft, one of said elements comprising a driver radially movable with respect to the first shaft and another of said elements comprising a driven element axially movable with respect to the first shaft, a yoke adjustable relative to the first shaft and engaged with the housing for controlling the axial position of the driven element and the radial position of the driver element, and means for sustaining the torque reaction between the driver and the driven elements, means for reacting on the adhesion elements and providing a portion of a path for a portion of the power transmitted between the first and second shafts, and planetary gearing connecting the first and second shafts for transmitting the said portion of the power flowing through the first mentioned means, the speed ratio of the first and second shafts varying as the axial and radial relationship of the adhesion elements is varied.

References Cited in the file of this patent

UNITED STATES PATENTS

| | | |
|---|---|---|
| 1,132,603 | Myers | Mar. 23, 1915 |
| 1,856,383 | Gerdes | May 3, 1932 |
| 1,898,412 | Wellter | Feb. 21, 1933 |
| 2,029,042 | Turner | Jan. 28, 1936 |
| 2,520,057 | Pulese | Aug. 22, 1950 |